United States Patent [19]

Saxe

[11] Patent Number: 5,002,701
[45] Date of Patent: Mar. 26, 1991

[54] LIGHT POLARIZING MATERIALS AND SUSPENSIONS THEREOF

[75] Inventor: Robert L. Saxe, New York, N.Y.

[73] Assignee: Research Frontiers Incorporated, Woodbury, N.Y.

[21] Appl. No.: 428,103

[22] Filed: Oct. 27, 1989

Related U.S. Application Data

[63] Continuation-in-part of Ser. No. 309,693, Feb. 10, 1989, Pat. No. 4,877,313, which is a continuation-in-part of Ser. No. 913,516, Sep. 30, 1986, abandoned, which is a continuation-in-part of Ser. No. 742,797, Jun. 10, 1985, abandoned.

[51] Int. Cl.$^5$ .......................... G02B 5/30; G02B 5/22
[52] U.S. Cl. .................................. 252/586; 252/585; 252/582; 350/398; 350/395
[58] Field of Search ........... 252/586, 582, 585, 299.01, 252/299.2, 299.4, 583, 584, 587, 588; 350/391

[56] References Cited

U.S. PATENT DOCUMENTS 4,877,313 10/1989 Saxe .................................. 350/391

Primary Examiner—Robert L. Stoll
Assistant Examiner—Greg M. Sweet
Attorney, Agent, or Firm—Jacobs & Jacobs

[57] ABSTRACT

Light-polarizing materials comprising a complex obtained by reacting elemental iodine, and iodide and a monoalkyl- or dialkyl-piperazinedione or an unsubstituted or monoalkyl- or dialkyl- substituted 2,5-dicarboxy-pyrazine, and uses thereof in liquid suspensions, set suspensions and light valves.

16 Claims, No Drawings

LIGHT POLARIZING MATERIALS AND SUSPENSIONS THEREOF

This application is a continuation-in-part of copending application Ser. No. 309,693, filed Feb. 10, 1989, now U.S. Pat. No. 4,877,313, issued Oct. 31, 1989, which is a continuation-in-part of then copending and now abandoned application Ser. No. 913,516, filed Sept. 30, 1986, which in turn was a continuation-in-part of then copending and now abandoned application Ser. No. 742,797, filed June 10, 1985, all of which are incorporated herein by reference thereto.

This invention relates to light-polarizing materials, to set suspensions and fluid suspensions thereof, and to light valves containing such fluid suspensions.

Light-polarizing materials, such as colloidal suspensions of herapathite and herapathite-like light-polarizing crystals, are described in U.S. Pat. Nos. 1,951,664 (Land) and 2,178,996 (Land), respectively. U.S. Pat. No. 2,237,567 (Land) discloses the production of light-polarizing material in sheet form by various methods including application of a solution of iodine and an iodide to a sheet of polyvinyl alcohol which had been previously stretched to orient the molecules therein. Numerous other patents relating to light-polarizing materials, set suspensions thereof and laminated products derived therefrom and uses thereof are in the art including, for example, U.S. Pat. Nos. 2,041,138 (Land), 2,078,254 (Land), 2,168,220 (Land), 2,168,221 (Land), 2,185,018 (Sauer), 2,230,262 (Pollack), 2,246,087 (Bailey et al), 2,256,108 (Blake), 2,263,249 (Rogers), 2,306,108 (Land et al), 2,328,219 (Land), and 2,375,963 (Thomas). U.K. Patent 433,455 discloses the use of particles of purpureocobaltchloridesulphateperiodide in the formation of light-polarizing bodies. These and the other patents and prior art referred to in this specification are incorporated herein by reference thereto.

At present, important uses for laminated set suspensions of light-polarizing materials, often referred to as "sheet polarizers", include lenses for polarized sunglasses, components of the twisted nematic and other types of liquid crystal displays and filters of various types including contrast enhancement filters for use in conjunction with light emissive displays. However, the sheet polarizers thus employed are well known to be frequently subject to degradation due to high levels of heat, ultraviolet radiation and/or especially moisture.

Fluid suspensions of light-polarizing and other materials have been used in light valves, comprising a cell containing a fluid suspension of minute particles which can be oriented by an electric or magnetic field to change the transmission of light through the suspension. See for example, U.S. Pat. Nos. 3,708,219 (Forlini et al), 3,743,382 (Rosenberg), 4,078,856 (Thompson et al), 4,113,362 (Saxe et al), 4,164,365 (Saxe), 4,407,565 (Saxe), and 4,422,963 (Thompson et al).

U.S. Pat. No. 4,131,334 (Witte et al) describes a process for forming light-polarizing particles by hydrogenation of a nitrogen-containing organic compound, which is then reacted with an appropriate acid to form a salt. The salt may then be reacted, usually with iodine and an inorganic iodide, to produce stable polyiodide particles.

An object of the present invention is to provide light-polarizing materials that have high stability with respect to ultraviolet radiation, elevated temperatures and/or high levels of moisture.

Polyhalides, including polyiodides, have been known for quite some time. A polyiodide is a complex of iodine atoms and an inorganic or organic matrix. Godina et al discuss polyiodides and other polyhalides in detail in J. Gen. Chem. USSR, 20, (1950), pages 1005–1016. Among the known polyiodides is the light-polarizing crystalline material, herapathite, which is formed by reaction of quinine bisulfate, iodine and HI. Salts of other members of the quinine alkaloid family also form light-polarizing polyiodides by reaction with iodine and HI, such as cinchonidine bisulfate. In these materials, the elemental iodine combines with the alkaloid acid salt in the form of the polyiodide anion, which has been variously described as $I_3^-$ by Godina et al and as $I_5^-$ by Teitelbaum et al, JACS, 100 (1978) pages 3215–3217. Godina et al show that the polyiodide anion is formed by reaction between iodine and HI, e.g.

(1) $I_2 + HI = H^+ + I_3^-$

Likewise, the $I_5^-$ polyiodide anion would be formed by the reaction (2) $2I_2 + HI = H^+ + I_5^-$ Godina et al explain that light-polarizing polyiodides comprise the polyiodide anion and the acid salt of quinine and the like as the cation. However, polyiodides can also be formed without any apparent cation being present, such as the starch-iodine complex and the stretched or oriented polyvinyl alcohol-iodine complex. Teitelbaum et al report that the starch-iodine complex contains adsorbed iodine in the form of chains of iodine within the amylase component of starch, the chains being made up of $I_5^-$ polyiodide anions as the dominant species. Godina et al theorize that herapathite, starch-iodine and oriented PVA-iodine complex are "adsorbing polyiodides" in which molecular iodine is adsorbed in layers on the polyiodide chains.

The light-polarizing material of the present invention is a complex obtained by reacting (i) elemental iodine, (ii) a hydrohalide acid and/or an ammonium or alkali metal or alkaline earth metal halide and (iii) a compound of formula I or II below. This complex contains adsorbed molecular iodine. We believe that the complex also contains the polyiodide anion, $I_x^-$, where x is 3 or 5, since Godina et al and Teitelbaum et al both report that the polyiodide anion is formed by reaction between (i) elemental iodine and (ii) an iodide. Moreover, Godina et al report that crystals containing adsorbed molecular iodine and the polyiodide anion are light-polarizing.

In the Examples that follow, light polarizing materials are prepared by reacting a compound I or II with iodine and an iodide, bromide or chloride. In such cases, the respectively anions would be -I-I-I-I-I-
-I-I-Br-I-I
-I-I-Cl-I-I using the structure elucidated by Teitelbaum et al as a model.

Godina et al report that light-polarizing complexes containing adsorbed molecular iodine cannot be defined stoichiometrically by structural formula. Hence, the light-polarizing material of the present invention is defined in product-by-process format.

Compounds I or II that are useful in forming the light-polarizing materials of the invention have the formula:

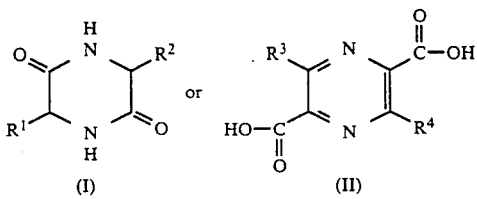

wherein $R^1$, $R^2$, $R^3$ and $R^4$ are independently hydrogen or lower alkyl, provided that at least one of $R_1$ and $R_2$ is lower alkyl.

When $R^1$, $R^2$, $R^3$ and $R^4$ are lower alkyl, the lower alkyl may be straight or branched chain alkyl, such as methyl, ethyl, propyl, isopropyl, butyl, isobutyl, t-butyl and the like. Usually, the lower alkyl will have from 1 to about 6 carbon atoms. In general, the solubility of compound I or II in organic solvents increases and the solubility in water decreases as the number of carbon atoms of the lower alkyl substituents increases. Hence, the desired balance of organic solvent/water solubility may be obtained by appropriate selection of the lower alkyl groups.

Compounds I and II are known per se or may be isomers, homologues or analogs of known compounds and may be prepared analogously to such known compounds.

Useful compounds of formulas I and II include:

Compound
1—3,6-dimethyl-2,5-piperazinedione.
2—2,5-dicarboxy-pyrazine.
3—3,6-dimethyl-pyrazine-2,5-dicarboxylic acid.

The light-polarizing materials of this invention are formed by reacting a compound of formula I or II with elemental iodine and a hydrohalide acid and/or an ammonium, alkali metal or alkaline earth metal halide, in a suitable solvent, such as alcohol or etheralcohol. See U.S. Pat. Nos. 1,951,661, 2,176,516 and 2,289,712. The halide is usually an iodide, but can also be a bromide or chloride. Preferably, the reaction to form the polyhalide takes place in the presence of a protective colloid, such as nitrocellulose or a copolymer as disclosed in U.S. Pat. No. 4,164,365, issued Aug. 14, 1979. It is presently preferred to provide compound I or II in a first solution and a mixture of iodine and ammonium or alkali metal or alkaline earth metal halide in a second solution, but, if desired, the halide can be in either or both of the solutions. The solutions are then mixed together, and the polyhalides are readily formed even at room temperature. Light-polarizing polyhalide crystals are then recovered by any suitable technique, such as by filtering and the like.

For use in a light valve, the polyhalide particles are suspended in a liquid suspending medium. As is known, the liquid suspending medium may be virtually any electrically resistive liquid so long as it suspends the particles and dissolves the polymeric stabilizer. Preferably, the liquid suspending medium has a relatively high electrical resistivity and low vapor pressure, and does not degrade or attack the particles or other components of the suspension. See e.g. U.S. Pat. Nos. 4,270,841 and 4,407,565 to Saxe.

For use in set suspensions, the polyhalide particles are dispersed or distributed throughout a sheet formed of suitable film-forming material, such as cellulose acetate or polyvinylalcohol or the like. See e.g. U.S. Pat. Nos. 2,178,996 and 2,041,138.

EXAMPLES 1–3

Approximately 0.65 g. of compound 1 is dissolved in 5 g. of water and heated until well dissolved. To this solution approximately 10 g. of 2-ethoxyethanol is added and that solution is mixed with 10 g. of a solution of n-propanol in which 1.3 g. of iodine and 0.48 g. of a 57% HI solution in water is dissolved. Blue-colored light-polarizing crystals are formed. The same procedure is followed and similar results are obtained using compounds 2 and 3 in place of compound 1.

EXAMPLES 4–6

Approximately 0.65 g. of compound 1 is dissolved in 5 g. of water and heated until well dissolved. To this solution approximately 10 g. of 2-ethoxyethanol is added and that solution is mixed with a solution of 10 g. of n-propanol in which 0.22 g. of calcium iodide and 1.3 g. of iodine is dissolved. Blue-colored light-polarizing crystals are formed. The same procedure is followed and similar results are obtained using compounds 2 and 3 in place of compound 1.

EXAMPLES 7–9

Examples 4–6 are repeated but with an effective amount of $CaBr_2$ substituted for $CaI_2$. Light-polarizing crystals having a somewhat different bluish color are formed.

EXAMPLES 10–12

Examples 4–6 are repeated but with an effective amount of $CaCl_2$ substituted for $CaI_2$. Light-polarizing crystals having a somewhat different bluish color are formed.

Some of the compounds I and II used in the present invention are known to form metal salts and/or to be metal-chelating compounds. Accordingly, one possible explanation for the formation of the light-polarizing materials of this invention is that when the compounds I or II are reacted with iodine and a halide, the halide and iodine enter into the reaction in an ionic form. For example, if the halide is calcium iodide, $CaI_2$, iodine may enter the reaction as $Ca^{+2}(I_x)_2{}^-$, with the positively charged calcium ion being chelated by compounds I and II and the $(I_x)^-$ anion being bonded to the positive calcium ion, thereby forming a polyiodide crystal. While this explanation seems reasonable, it is not intended that this application be bound by this theory.

Liquid suspensions of the polyhalide particles of this invention can be easily prepared by utilizing a procedure somewhat similar to that for preparing liquid suspensions of dihydrocinchonidine sulfate polyiodide described in Example 2 of U.S. Pat. No. 4,131,334 and in Example 1 of U.S. Pat. No. 4,407,565, but with compounds I and II of the present invention substituted for dihydrocinchonidine sulfate and the quantities of the reactants adjusted as, for example, given in the aforesaid examples and in U.S. patent application Ser. No. 309,693, now U.S. Pat. No. 4,877,313, issued Oct. 31, 1989. The liquid suspensions of the present invention will be stable at temperatures of 85° C. or more and will withstand prolonged exposure to ultraviolet radiation.

Liquid suspensions of the type described above can be used in light valves which utilize an AC electric field to orient the particles in said suspensions to change and/or control the transmission of light through the suspension. Such light valves can be used, for example, as variable transmission windows, filters, mirrors, and eyeglasses, and as electronic alphanumeric and graphic image displays.

By modifying the composition of the suspension, however, it is possible to produce what is known in the prior art as a set suspension, rather than a fluid suspension or liquid suspension usable in a light valve as described above. A set suspension of the particles of the present invention would comprise, for example, a light-polarizing sheet or film in which said particles would be incorporated along with other materials.

There are many processes known in the art for producing light-polarizing sheets and films. For example, U.S. Pat. No. 2,178,996 discloses a process for forming certain light-polarizing particles, mixing said particles into a dispersion medium which may include cellulose acetate, and subjecting the dispersion of particles to flow or extrusion or stretch, or rolling, so that the needle axis of the dispersed polarizing crystals may be oriented to substantial parallelism and a thin, sheet-like polarizing body produced. U.S. Pat. No. 2,041,138 discloses that polarizing bodies may preferably be made in the form of a relatively thin sheet or film comprising the suspending medium and the minute particles dispersed therein. If desired, the polarizing body may itself be permanently or detachably fixed to a suitable support, preferably transparent, as for example, to a plate of glass or to a sheet of celluloid. Such a support may be desirable with conditions where it is found that the polarizing body itself may require some form of protection. It also discloses the use of asymmetric particles, the flowing of the medium that includes said particles past an edge, and retaining said particles in an oriented position by setting or hardening said medium.

U.S. Pat. No. 2,168,220 discloses information relating to polarizing material sold under the trade name "Polaroid". Use of plasticizers, adhesives and various types of laminations and methods for forming said laminations are disclosed.

Numerous types of polarizinq films and uses for polarizers are disclosed in U.S. Pat. No. 2,246,087 including, for example, use in windshields, windows, eyeglasses, goggles, sunglasses, camera lenses, microscopes, mirrors and in connection with three dimensional movies.

A process for transferring light-polarizing films from one support to another and various materials used in connection therewith are disclosed in U.S. Pat. No. 2,256,108.

The information available from any of the aforesaid patents and from numerous other patents and other sources known in the art can be used to make light-polarizing set suspensions, films and sheets which include particles oriented in substantial parallelism, and light-polarizing bodies and products made therefrom.

However, many light polarizers in commercial use today do not incorporate films or sheets having solid discrete particles oriented in parallel therein, but rather use a sheet of polyvinyl alcohol polyiodide which has its optic axis in the plane of the sheet and which transmits with substantially no absorption only light vibrating substantially perpendicularly to its optic axis, as described in U.S. Pat. Nos. 2,237,567 and 2,375,963 and other sources known in the art. The commercially available polarizers are known to be susceptible to degradation when subjected for prolonged periods to harsh environmental conditions such as high temperatures, high humidity, ultraviolet radiation and especially combinations of such conditions.

However, the polarizers made from set suspensions of the particles and other materials of the present invention will be stable to high levels of heat and ultraviolet radiation and will tolerate water excellently. Accordingly, the present invention makes possible a substantial improvement in the quality of light-polarizing bodies and products incorporating such materials.

Although specific embodiments of the invention have been described, it will be appreciated that many modifications thereon may be made by one skilled in the art, which fall within the spirit and scope of this invention.

I claim:

1. A light-polarizing material containing adsorbed iodine, comprising a complex obtained by reacting (i) elemental iodine, (ii) a hydrohalide acid or an ammonium or alkali metal or alkaline earth metal halide and (iii) a compound having the formula:

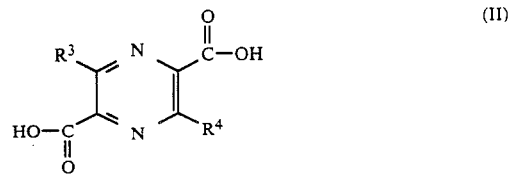

(II)

wherein $R^3$ and $R^4$ are independently hydrogen or lower alkyl.

2. The light-polarizing material according to claim 1, wherein said halide of said hydrohalide acid and/or said ammonium or alkali metal or alkaline earth metal halide is chloride, bromide or iodide.

3. The light-polarizing material according to claim 1, wherein said compound is 2,5-dicarboxy-pyrazine or 3,6-dimethylpyrazine-2,5-dicarboxylic acid.

4. A liquid suspension for a light valve, comprising an electrically resistive liquid suspending medium, a plurality of small, anisometrically shaped particles of the light-polarizing material of claim 1 dispersed therein and at least one dispersing material dissolved therein for dispersing said particles in said suspension.

5. A liquid suspension according to claim 4, wherein said halide of said hydrohalide acid and/or said ammonium or alkali metal or alkaline earth metal halide is chloride, bromide or iodide.

6. The liquid suspension according to claim 4, wherein said compound is 2,5-dicarboxy-pyrazine or 3,6-dimethyl-pyrazine-2,5-dicarboxylic acid.

7. A light-polarizing body, comprising a plurality of particles of the light-polarizing material according to claim 1, dispersed in a carrier, the polarizing axis of said particles being oriented and immovably retained by said carrier in substantial parallelism.

8. The light-polarizing body according to claim 7, wherein said halide of said hydrohalide acid and/or said ammonium or alkali metal or alkaline earth metal halide is chloride, bromide or iodide.

9. The light-polarizing polyhalide according to claim 7, wherein said compound is 2,5-dicarboxy-pyrazine or 3,6-dimethylpyrazine-2,5-dicarboxylic acid.

10. In a light valve, comprising a cell containing a suspension of light-polarizing particles in a liquid suspending medium, the improvement wherein said light-polarizing particles are particles of the light-polarizing material according to claim 1.

11. The light valve according to claim 10, wherein said halide of said hydrohalide acid and/or said ammonium or alkali metal or alkaline earth metal halide is chloride, bromide or iodide.

12. The light valve according to claim 10, wherein said compound is 2,5-dicarboxy-pyrazine or 3,6-dimethyl-pyrazine-2,5-dicarboxylic acid.

13. The light-polarizing material according to claim 1, wherein said compound is 2,5-dicarboxy-pyrazine.

14. The liquid suspension according to claim 4, wherein said compound is 2,5-dicarboxy-pyrazine.

15. The light-polarizing body according to claim 7, wherein said compound is 2,5-dicarboxy-pyrazine.

16. The light valve according to claim 10, wherein said compound is 2,5-dicarboxy-pyrazine.

* * * * *